United States Patent Office 2,721,357
Patented Oct. 25, 1955

2,721,357

METHOD OF MAKING ELECTRICALLY CONDUCTIVE POLYSTYRENE ARTICLES

Frederick Hochberg, Red Bank, N. J., assignor to the United States of America as represented by the Secretary of the Army No Drawing. Application September 17, 1952, Serial No. 310,150

6 Claims. (Cl. 18—55)

(Granted under Title 35, U. S. Code (1952), sec. 266)

The invention described herein may be manufactured and used by or for the Government for governmental purposes without the payment of any royalty thereon.

This invention relates to electrically conductive polystyrene and to method of making the same.

Most of the known processes for making synthetic high polymers electrically conductive consist in dispersing finely divided conductive materials such as carbon, graphite or metallic powder in the plastic material. In such a dispersion the conductive material constitutes the dispersed phase and the plastic material the continuous phase, and therefore conductivity depends on the chance contact of the conductive particles dispersed thruout the mass of plastic material. The higher the percentage of conductive materials within the plastic material the higher will be the conductivity of the mixture.

To obtain a reasonable degree of conductivity a very high percentage of conductive materials is necessary but such high percentages markedly impair the physical properties of the plastic material. Furthermore, the processes of hot-press molding or injection molding of a molding powder consisting of a mixture of thermoplastic polymers and finely divided conductive materials generally tend to result in a product of much lower conductivity as should be expected, due to a "skin effect" resulting from the fact that each conductive particle is completely covered with a film of the thermoplastic material thus insulating the conductive particles from each other.

To overcome the above indicated as well as other disadvantages and to obtain a conductive synthetic high polymer of high conductivity while using a relatively low percentage of metal it has been proposed (see patent application S. N. 259,276, filed November 30, 1951) to coat the surface of plastic molding powders with a continuous extremely thin metal film in such a manner that the deformation of the particles during the hot press or injection molding will crack and rip that metal film and thus allow the exposed parts of the plastic material of one particle to coalesce with the exposed parts of the neighboring particles. The cracked and ripped films of all the particles will form innumerable conductive paths of considerable length are formed thruout the compressed mass in all directions.

In applying this method to the manufacture of electrically conductive polystyrene and other thermoplastic high polymers (such as acrylates, vinyl resins, etc.) it has now been found that products of high conductivity and great mechanical strength may be obtained by silver plating polystyrene molding powders (or molding powders of other thermoplastic materials) with the aid of chemical reduction methods and by hot-press molding the plated powder at temperatures that are lower than the conventional molding temperatures for the particular uncoated molding powder and at pressures that are higher than the conventional pressures.

The invention will be more apparent from the following description of specified embodiments of the inventive idea:

Granular polystyrene of between 60 to 80 mesh is preferably first washed with diluted sodium hydroxide solution and then with water. The washed polystyrene powder is then air dried with or without the use of alcohol to remove the water.

Instead of washing with alkaline the molding powder may first be wetted with an aqueous solution of stannous chloride ($SnCl_2$). This wetting may best be accomplished by using a solution of about 2% of stannous chloride in water and a wetting agent (e. g. Duponal). The purpose of this pretreatment is to improve the adhesion of the subsequent silver film on the surface of the molding powder.

The treated or untreated polystyrene molding powder is now plated according to the invention with a thin coat of silver in the following manner:

100 grams of polystyrene molding powder having a particle size of between 60 to 80 mesh are treated with about 3000 cc. of a 1% silver nitrate ($AgNO_3$) solution by first mixing the powder with a small amount of the silver nitrate solution in order to obtain a paste. If necessary, a small amount of a wetting agent (as for instance, "Duponal") is added to facilitate the making of the paste. Then the rest of the silver nitrate solution is added and 3000 cc. of a hydrazine sulfate solution is slowly added while the mixture is vigorously stirred. The hydrazine sulfate solution is made by dissolving in 100 cc. of water, about 2 grams of hydrazine sulfate, 1.75 grams of ammonium hydroxide ($NH_4OH$) and about 0.5 gram of sodium hydroxide. The stirring is continued until the reaction has stopped, that is, until no more metallic silver is precipitated on the surface of the molding powder. The coated powder is then filtered from the remaining solution under suction and washed with distilled water.

If the silver plating appears to be insufficient the above described procedure may be repeated.

The molding powder prepared according to the above described method is now molded by using relatively low temperature and relatively high pressure. Conventional temperatures and pressures are unsuitable and do not lead to a conductive polystyrene of adequate mechanical properties. If, however, according to the invention the above manufactured molding powder is molded at approximately 130° F. and a pressure of about 20,000 p. s. i. products of high conductivity and good mechanical properties are obtained.

While this invention has been disclosed with reference to specific embodiments thereof, it will be understood that the scope of the invention is to be considered as limited by the appended claims only.

What is claimed is:

1. Method of making electrically conductive synthetic high polymers of the thermoplastic type comprising plating a thermoplastic molding powder of a particle size of between 60 to 80 mesh with a continuous, extremely thin silver film with the aid of chemical reduction methods and molding the plated powder at temperatures that are lower than the conventional molding temperatures for the uncoated powder and at pressures that are markedly higher than those conventionally used for the uncoated molding powders.

2. Method of making electrically conductive synthetic high polymers of the thermoplastic type according to claim 1 in which the silver plating is accomplished by means of reducing silver from a silver nitrate solution containing hydrazine sulfate.

3. Method of making electrically conductive synthetic high polymers of the thermoplastic type according to claim 1 in which the molding powder is pretreated with a solution of stannous chloride.

4. Method of making electrically conductive polystyrene comprising silver plating a polystyrene molding powder with the aid of chemical reduction methods and molding the plated polystyrene powder at temperatures that are lower and at pressures that are higher than the respective molding temperatures and molding pressures conventionally used for the unplated polystyrene molding powders.

5. Method of making electrically conductive polystyrene according to claim 4 in which polystyrene is stirred into an aqueous silver nitrate solution into which an aqueous alkaline hydrazine sulfate solution is added under stirring to cause silver plating of the polystyrene powder whereupon the plated polystyrene powder is completely separated from the liquid and molded at about 130° F. and a pressure of about 20,000 p. s. i.

6. Method of making electrically conductive polystyrene according to claim 5 in which a wetting agent is added to the silver nitrate solution.

References Cited in the file of this patent

UNITED STATES PATENTS

| | | |
|---|---|---|
| 1,583,545 | Frood et al. | May 4, 1926 |
| 1,987,969 | Parkin | Jan. 15, 1935 |
| 2,406,345 | Brennan | Aug. 27, 1946 |
| 2,683,669 | Coler | July 13, 1954 |